US012183317B2

(12) United States Patent
Kobayashi et al.

(10) Patent No.: US 12,183,317 B2
(45) Date of Patent: Dec. 31, 2024

(54) CALL ENVIRONMENT GENERATION METHOD, CALL ENVIRONMENT GENERATION APPARATUS, AND PROGRAM

(71) Applicant: NIPPON TELEGRAPH AND TELEPHONE CORPORATION, Tokyo (JP)

(72) Inventors: Kazunori Kobayashi, Tokyo (JP); Ryotaro Sato, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 234 days.

(21) Appl. No.: 17/928,556

(22) PCT Filed: Jun. 4, 2020

(86) PCT No.: PCT/JP2020/022081
§ 371 (c)(1),
(2) Date: Nov. 29, 2022

(87) PCT Pub. No.: WO2021/245871
PCT Pub. Date: Dec. 9, 2021

(65) Prior Publication Data
US 2023/0230570 A1 Jul. 20, 2023

(51) Int. Cl.
*G10K 15/02* (2006.01)
*H04R 1/40* (2006.01)
(Continued)

(52) U.S. Cl.
CPC ............. *G10K 15/02* (2013.01); *H04R 1/403* (2013.01); *H04R 3/12* (2013.01); *H04S 7/302* (2013.01); *H04R 2499/13* (2013.01)

(58) Field of Classification Search
CPC .......... G10K 15/02; H04R 1/403; H04R 3/12; H04R 2499/13; H04S 7/302
See application file for complete search history.

(56) References Cited

U.S. PATENT DOCUMENTS 10,418,019 B1 * 9/2019 Murad ............... G10K 11/1754
10,440,467 B1 10/2019 You et al.
(Continued)

FOREIGN PATENT DOCUMENTS

CN 109862472 A 6/2019
DE 60208480 T2 * 8/2006 ........... H04B 1/3877
(Continued)

OTHER PUBLICATIONS

Suzuki, Instruction Manual for "Smartphone—Link Navigation", [online], searched on May 12, 2020, on the Internet <URL: http://www.suzuki.co.jp/car/information/navi/pdf/navi.pdf> with English translation generated by computer.

*Primary Examiner* — David L Ton

(57) ABSTRACT

Provided is a technique to generate a call environment that prevents call contents from being heard by a person other than a person speaking on the phone in a case where call voice is output from a speaker. Speakers installed in an automobile are denoted by $SP_1, \ldots, SP_N$, a first filter coefficient used to generate an input signal for a speaker $SP_n$ is denoted by $F_n(\omega)$, and a second filter coefficient that is different from the first filter coefficient and is used to generate an input signal for the speaker $SP_n$ is denoted by $\tilde{F}_n(\omega)$. A call environment generation method includes: an acoustic signal generation step of generating, when detecting a start signal of a call, a call-time acoustic signal that is obtained by adjusting volume of an acoustic signal to be reproduced during the call, by using a predetermined volume value; a first local signal generation step of generating a sound signal $S_n$ as an input signal for the speaker $SP_n$ from a voice signal of the call by using the first filter coefficient $F_n(\omega)$; and a second local signal generation step of generating an acoustic signal $A_n$ as an input signal for the speaker
(Continued)

$SP_n$ from the call-time acoustic signal by using the second filter coefficient $\tilde{F}_n(\omega)$.

13 Claims, 5 Drawing Sheets

(51) Int. Cl.

| | |
|---|---|
| ***H04R 3/12*** | (2006.01) |
| ***H04S 7/00*** | (2006.01) |

(56) References Cited

U.S. PATENT DOCUMENTS

| | | | | |
|---|---|---|---|---|
| 2016/0196818 | A1* | 7/2016 | Christoph | H04S 7/301<br>381/71.6 |
| 2017/0316773 | A1* | 11/2017 | Walther | H04K 3/45 |

FOREIGN PATENT DOCUMENTS

| | | | | |
|---|---|---|---|---|
| DE | 102014214052 | A1 | | 1/2016 |
| EP | 1301015 | A2 | | 4/2003 |
| JP | 2004096664 | A | | 3/2004 |
| JP | 2014176052 | A | * | 9/2014 |
| JP | 2019066601 | A | | 4/2019 |

* cited by examiner

CALL ENVIRONMENT GENERATION METHOD, CALL ENVIRONMENT GENERATION APPARATUS, AND PROGRAM

CROSS-REFERENCE TO RELATED APPLICATIONS

This application is a U.S. National Stage Application filed under 35 U.S.C. § 371 claiming priority to International Patent Application No. PCT/JP2020/022081, filed on 4 Jun. 2020, the disclosure of which is hereby incorporated herein by reference in its entirety.

TECHNICAL FIELD

The present invention relates to a technique to generate a call environment for hands-free call in, for example, an automobile.

BACKGROUND ART

Some of audio systems for an automobile enable a hands-free call. In a system disclosed in Non-Patent Literature 1, when a telephone call is started, music playback is temporarily stopped, and only call voice is output from a speaker in the automobile.

CITATION LIST

Non-Patent Literature

Non-Patent Literature 1: SUZUKI, Instruction Manual for "Smartphone-Link Navigation", [online], searched on May 12, 2020, on the Internet <URL: http://www.suzuki.co.jp/car/information/navi/pdf/navi.pdf>

SUMMARY OF THE INVENTION

Technical Problem

Since the music playback is stopped in the system disclosed in Non-Patent Literature 1, not only a driver but also a passenger on a front passenger seat can hear the call voice as illustrated in FIG. 1, and call contents may be heard by the passenger on the front passenger seat. This is problematic in a case where the driver does not want to allow the call contents to be heard by anyone.

In other words, in the existing system, in the case where the call voice is output from the speaker, it is not possible to prevent the call contents from being heard by a person other than a person speaking on the phone.

Therefore, an object of the present invention is to provide a technique to generate a call environment that prevents the call contents from being heard by a person other than the person speaking on the phone in the case where the call voice is output from the speaker.

Means for Solving the Problem

A call environment generation method according to an aspect of the present invention includes, when speakers installed in an acoustic space are denoted by $SP_1, \ldots, SP_N$, and positions to specify a call place in the acoustic space are denoted by $P_1, \ldots, P_M$: a position acquisition step of acquiring, when a call environment generation apparatus detects a start signal of a call, a position $P_{M\_u}$ ($M_u$ is integer satisfying $1 \le M_u \le M$) as a call place of the call; and a sound emission step of causing the call environment generation apparatus to emit, from a speaker $SP_n$, sound based on a sound signal $S_n$ as an input signal for the speaker $SP_n$ and an acoustic signal $A_n$ as an input signal for the speaker $SP_n$, where $n=1, \ldots, N$, the sound signal $S_n$ being generated from a voice signal of the call, the acoustic signal $A_n$ being generated from an acoustic signal that is obtained by adjusting volume of an acoustic signal to be reproduced during the call (hereinafter, referred to as call-time acoustic signal), wherein sound based on a sound signal $S_1, \ldots,$ and a sound signal $S_N$ is referred to as sound based on the voice signal of the call, and sound based on an acoustic signal $A_1, \ldots,$ and an acoustic signal $A_N$ is referred to as sound based on the call-time acoustic signal, the sound based on the voice signal of the call is emitted to be heard louder at the position $P_{M\_u}$ than at a position $P_m$ ($m=1, \ldots, M_u-1, M_u+1, \ldots, M$) other than the position $P_{M\_u}$, and the sound based on the call-time acoustic signal is emitted to be heard louder at the position $P_m$ ($m=1, M_u-1, M_u+1, \ldots, M$) other than the position $P_{M\_u}$ than at the position $P_{M\_u}$.

A call environment generation method according to another aspect of the present invention includes, when speakers installed in an automobile are denoted by $SP_1$, $SP_N$, a position of a driver seat in the automobile is denoted by $P_1$, positions of seats other than the driver seat in the automobile are denoted by $P_2, \ldots, P_M$, a filter coefficient used to generate an input signal for a speaker $SP_n$ (hereinafter, referred to as first filter coefficient) is denoted by $F_n(\omega)$ ($n=1, \ldots, N$, where w is frequency), and a filter coefficient that is different from the first filter coefficient and is used to generate an input signal for the speaker $SP_n$ (hereinafter, referred to as second filter coefficient) is denoted by $\tilde{F}_n(\omega)$ ($n=1, \ldots, N$, where $\omega$ is frequency): an acoustic signal generation step of generating, when a call environment generation apparatus detects a start signal of a call, an acoustic signal that is obtained by adjusting volume of an acoustic signal to be reproduced during the call (hereinafter, referred to as call-time acoustic signal), by using a predetermined volume value; a first local signal generation step of causing the call environment generation apparatus to generate a sound signal $S_n$ as an input signal for the speaker $SP_n$ by filtering a voice signal of the call with the first filter coefficient $F_n(\omega)$, where $n=1, \ldots, N$; and a second local signal generation step of causing the call environment generation apparatus to generate an acoustic signal $A_n$ as an input signal for the speaker $SP_n$ by filtering the call-time acoustic signal with the second filter coefficient $\tilde{F}_n(\omega)$, where $n=1, \ldots, N$.

A call environment generation method according to still another aspect of the present invention includes, when speakers installed in an acoustic space are denoted by $SP_1, \ldots, SP_N$, positions to specify a call place in the acoustic space are denoted by $P_1, \ldots, P_M$, a filter coefficient to generate an input signal for a speaker $SP_n$ (hereinafter, referred to as first filter coefficient) is denoted by $F_n(\omega)$ ($n=1, \ldots, N$, where w is frequency), and a filter coefficient that is different from the first filter coefficient and is used to generate an input signal for the speaker $SP_n$ (hereinafter, referred to as second filter coefficient) is denoted by $\tilde{F}_n(\omega)$ ($n=1, \ldots, N$, where $\omega$ is frequency): a position acquisition step of acquiring, when a call environment generation apparatus detects a start signal of a call, a position $P_{M\_u}$ ($M_u$ is integer satisfying $1 \le M_u \le M$) as a call place of the call; an acoustic signal generation step of generating, when the call environment generation apparatus detects the start signal, an acoustic signal that is obtained by adjusting volume of an acoustic signal to be reproduced during the call (hereinafter, referred to as call-time acoustic signal), by using a predetermined volume value; a first local signal generation step of causing the call environment generation apparatus to generate a sound signal $S_n$ as an input signal for the speaker $SP_n$ by filtering a voice signal of the call with the first filter coefficient $F_n(\omega)$, where n=1, . . . , N; and a second local signal generation step of causing the call environment generation apparatus to generate an acoustic signal $A_n$ as an input signal for the speaker $SP_n$ by filtering the call-time acoustic signal with the second filter coefficient $\tilde{}F_n(\omega)$, where n=1, . . . , N.

Effects of the Invention

According to the present invention, in the case where the call voice is output from the speaker, it is possible to prevent the call contents from being heard by a person other than the person speaking on the phone.

DESCRIPTION OF EMBODIMENTS

Figure 1:
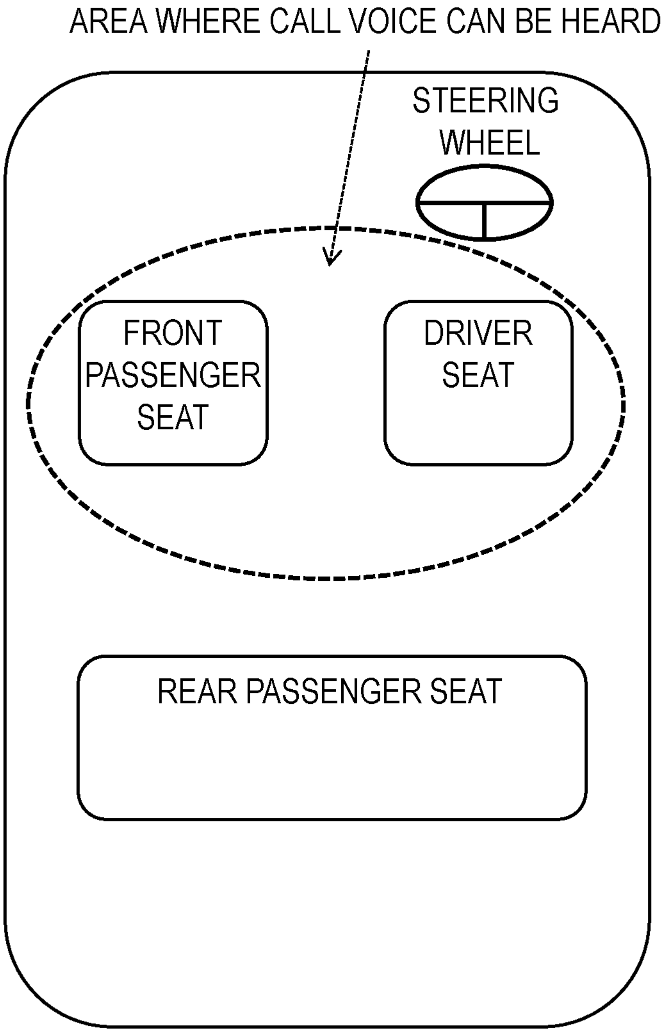
FIG. 1 is a diagram illustrating a state of playback sound in a hands-free call.

Some embodiments of the present invention are described in detail below. Functional units having the same function are denoted by the same reference numeral, and repetitive descriptions are omitted.

Before description of the embodiments, a notation method in this specification is described.

In the following, the symbol "^" (caret) represents a superscript. For example, $x^{y^\wedge z}$ represents that $y^z$ is a superscript for x, and $x_{y^\wedge z}$ represents that $y^z$ is a subscript for x. Further, the symbol "_" (underscore) represents a subscript. For example, $x^{y\_z}$ represents that $y_z$ is a superscript for x, and $x_{y\_z}$ represents that $y_z$ is a subscript for x.

Superscripts "^" and "~" for a certain character "x" should be essentially placed just above the character "x"; however, the superscripts "^" and "~" are described like "^x" and "~x" because of limitation of denotation in the specification.

First Embodiment

In a case where a driver performs a hands-free call in an automobile, a call environment generation apparatus 100 generates a call environment to prevent call voice from being heard by a passenger. To do so, the call environment generation apparatus 100 outputs, from N speakers installed in the automobile, the call voice and masking sound (for example, music) to prevent the call voice from being heard by the passenger, as playback sound. More specifically, the call environment generation apparatus 100 allows the call voice to be mainly heard on a driver seat, and allows the masking sound such as music to be mainly heard on seats other than the driver seat. In the following, the speakers installed in the automobile are denoted by $SP_1, \ldots, SP_N$, a position of the driver seat is denoted by $P_1$, and positions of the seats other than the driver seat are denoted by $P_2, \ldots, P_M$. For example, a position of a front passenger seat may be denoted by $P_2$, and positions of rear passenger seats may be denoted by $P_3$, $P_4$, and $P_5$.

Figure 2:
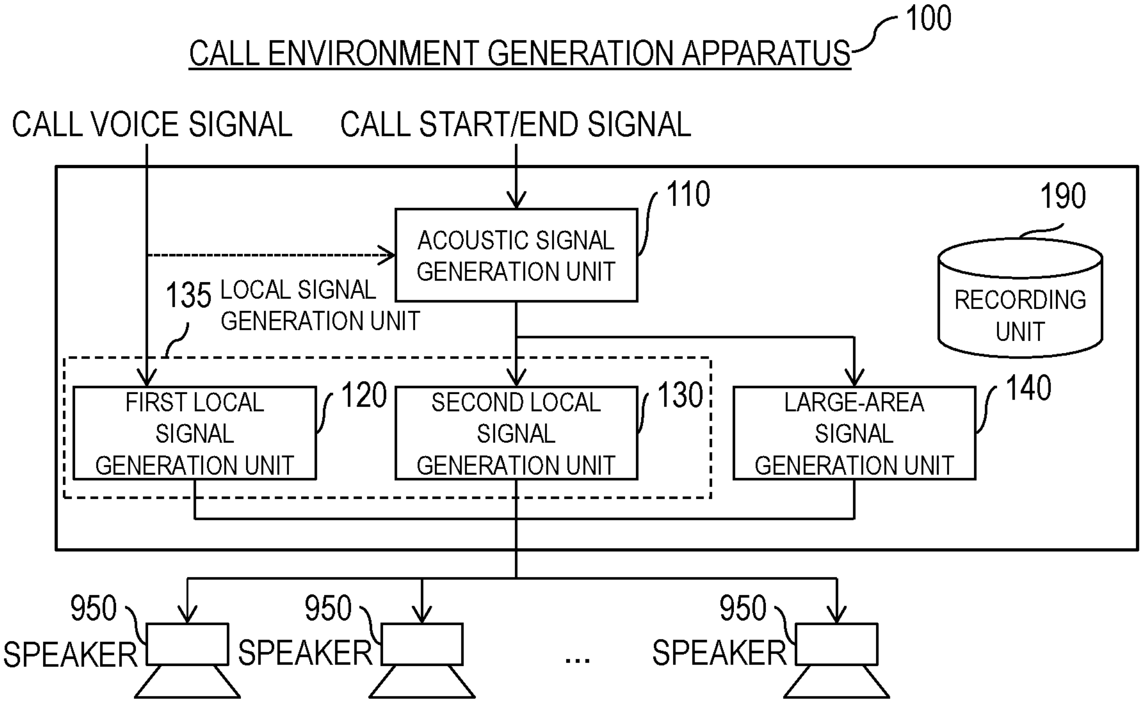
FIG. 2 is a block diagram illustrating an explanatory configuration of a call environment generation apparatus 100.
Figure 3:
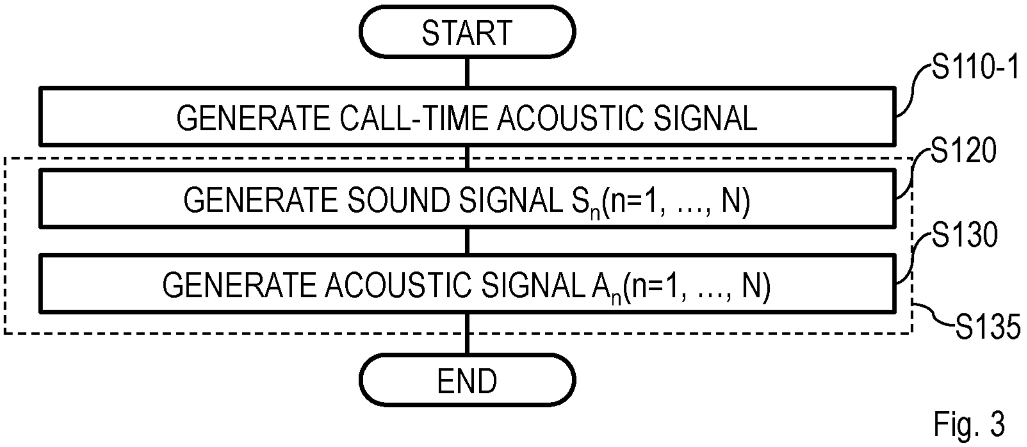
FIG. 3 is a flowchart illustrating exemplary operation by the call environment generation apparatus 100.
Figure 4:
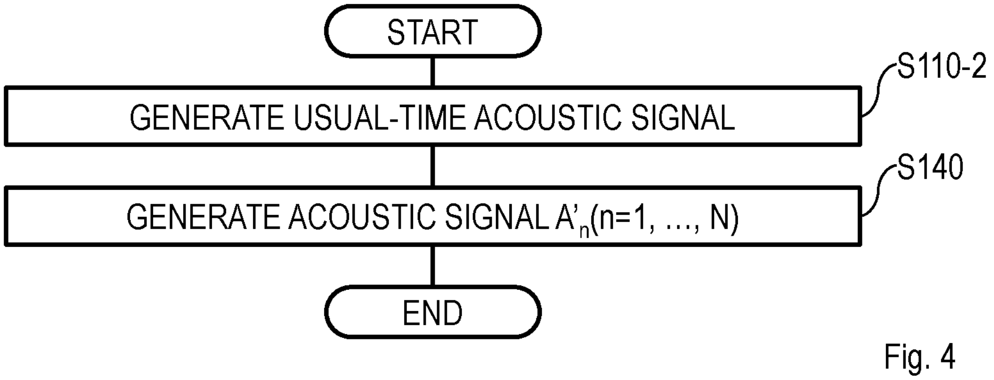
FIG. 4 is a flowchart illustrating exemplary operation by the call environment generation apparatus 100.

The call environment generation apparatus 100 is described below with reference to FIG. 2 to FIG. 4. FIG. 2 is a block diagram illustrating a configuration of the call environment generation apparatus 100. FIG. 3 and FIG. 4 are flowcharts each illustrating operation by the call environment generation apparatus 100. As illustrated in FIG. 2, the call environment generation apparatus 100 includes an acoustic signal generation unit 110, a first local signal generation unit 120, a second local signal generation unit 130, a large-area signal generation unit 140, and a recording unit 190.

For example, the recording unit 190 records filter coefficients used for filtering in the first local signal generation unit 120, the second local signal generation unit 130, and the large-area signal generation unit 140. These filter coefficients are used to generate input signals for the speakers. In the following, a filter coefficient used to generate an input signal for the speaker $SP_n$ by the first local signal generation unit 120 (hereinafter, referred to as first filter coefficient) is denoted by $F_{11}(\omega)$ (n=1, . . . , N, where w is frequency). A filter coefficient used to generate an input signal for the speaker $SP_n$ by the second local signal generation unit 130 (hereinafter, referred to as second filter coefficient) is denoted by $\tilde{}F_n(\omega)$ (n=1, . . . , N, where ω is frequency). A filter coefficient used to generate an input signal for the speaker $SP_n$ by the large-area signal generation unit 140 (hereinafter, referred to as third filter coefficient) is denoted by $\tilde{}F_n(\omega)$ (n=1, . . . , N, where w is frequency). Note that the first filter coefficient $F_n(\omega)$, the second filter coefficient $\tilde{}F_n(\omega)$, and the third filter coefficient $\hat{}F_n(\omega)$ are filter coefficients different from one another.

Further, the call environment generation apparatus 100 is connected to N speakers 950 (namely, speaker $SP_1$, and speaker $SP_N$).

The operation by the call environment generation apparatus 100 at start of a call is described with reference to FIG. 3.

In step S110-1, when detecting a start signal of a call, the acoustic signal generation unit 110 generates an acoustic signal obtained by adjusting volume of an acoustic signal to be reproduced during the call (hereinafter, referred to as call-time acoustic signal), by using a predetermined volume value, and outputs the acoustic signal. In other words, the acoustic signal generation unit 110 generates the acoustic signal to be reproduced during the call, and plays back masking sound during the call. For example, in a case where music has already been being played back at start of the call, the acoustic signal generation unit 110 generates the acoustic signal corresponding to the music being played back, as the acoustic signal to be reproduced during the call. Otherwise, the acoustic signal generation unit 110 generates the acoustic signal corresponding to previously prepared sound for masking call voice (for example, music suitable as BGM), as the acoustic signal to be reproduced during the call.

The acoustic signal generation unit 110 acquires the call-time acoustic signal by adjusting the volume of the acoustic signal to be reproduced during the call, by using the predetermined volume value. As the predetermined volume value, a preset volume value (for example, volume value suitable for masking call voice) can be used. The volume value suitable for masking the call voice is a volume value at which the call voice is difficult to be heard at the seat other than the driver seat (namely, position $P_m$ (m=2, M) other than position $P_1$) and hearing of the call voice is not interfered at the driver seat (namely, position $P_1$).

The acoustic signal generation unit 110 may use, as the predetermined volume value, a volume value calculated based on estimated volume of the acoustic signal to be reproduced during the call and estimated volume of a call voice signal. The estimated volume of the acoustic signal to be reproduced during the call is volume estimated based on a level of sound corresponding to the acoustic signal. The estimated volume of the call voice signal is volume estimated based on a level of received voice during the call. For example, a volume value V can be determined by the following expression, $$V = \beta \frac{R}{Q} \quad \text{[Math. 1]}$$

where, Q is the estimated volume of the acoustic signal to be reproduced during the call, R is the estimated volume of the call voice signal, and β is a predetermined constant.

In other words, the volume value V is determined by multiplying a ratio R/Q of estimated volume R of the call voice signal and estimated volume Q of the acoustic signal to be reproduced during the call by the preset constant β. Note that the constant β is a value at which the call voice is difficult to be heard at the seat other than the driver seat (namely, position $P_m$ (m=2, . . . , M) other than position $P_1$) and hearing of the call voice is not interfered at the driver seat (namely, position $P_1$), and is previously set.

Using the above-described volume value V makes it possible to make the ratio R/Q constant, and to constantly achieve an optimum masking effect.

In step S120, the first local signal generation unit 120 receives the call voice signal as an input, and filters the call voice signal with the first filter coefficient $F_n(\omega)$, thereby generating and outputting a sound signal $S_n$ as an input signal for the speaker $SP_n$, where n=1, . . . , N. The first filter coefficient $F_n(\omega)$ may be determined as a filter coefficient to filter the call voice signal such that the call voice becomes loud enough to be easily heard at the driver seat (namely, position $P_1$) and the call voice becomes as low as possible at the seat other than the driver seat (namely, position $P_m$ (m=2, . . . , M) other than position $P_1$). For example, when transfer characteristics from the speaker $SP_n$ to the position $P_m$ are denoted by $G_{n,m}(\omega)$ (n=1, . . . , N, m=1, . . . , M, where ω is frequency), the first filter coefficient $F_{11}(\omega)$ (n=1, . . . , N) can be determined as an approximation solution of the following expression.

$$\begin{cases} \sum_{n=1}^{N} F_n(\omega) G_{n,1}(\omega) = 1 \\ \sum_{n=1}^{N} F_n(\omega) G_{n,m}(\omega) = 0 (m \neq 1) \end{cases} \quad \text{[Math. 2]}$$

Note that the above-described approximation solution can be determined by using a least-square method.

In step S130, the second local signal generation unit 130 receives the call-time acoustic signal output in step S110-1 as an input, and filters the call-time acoustic signal with the second filter coefficient $\tilde{F}_n(\omega)$, thereby generating and outputting an acoustic signal $A_n$ as an input signal for the speaker $SP_n$, where n=1, . . . , N. The second filter coefficient $\tilde{F}_n(\omega)$ may be determined as a filter coefficient to filter the call-time acoustic signal such that the masking sound becomes loud enough to make it difficult to hear the call voice at the seat other than the driver seat (namely, position $P_m$ (m=2, . . . , M) other than position $P_1$) and the masking sound becomes as low as possible at the driver seat (namely, position $P_1$). For example, the second filter coefficient $\tilde{F}_n(\omega)$ (n=1, . . . , N) can be determined as an approximation solution of the following expression.

$$\begin{cases} \sum_{n=1}^{N} \tilde{F}_n(\omega) G_{n,1}(\omega) = 0 \\ \sum_{n=1}^{N} \tilde{F}_n(\omega) G_{n,m}(\omega) = 1 (m \neq 1) \end{cases} \quad \text{[Math. 3]}$$

Note that the above-described approximation solution can be determined by using a least-square method.

Finally, in step S950 (not illustrated), the speaker $SP_n$ (n=1, . . . , N) as the speaker 950 receives the sound signal $S_n$ output in step S120 and the acoustic signal $A_n$ output in step S130 as inputs, and emits sound based on the sound signal $S_n$ and the acoustic signal $A_n$.

Figure 5:
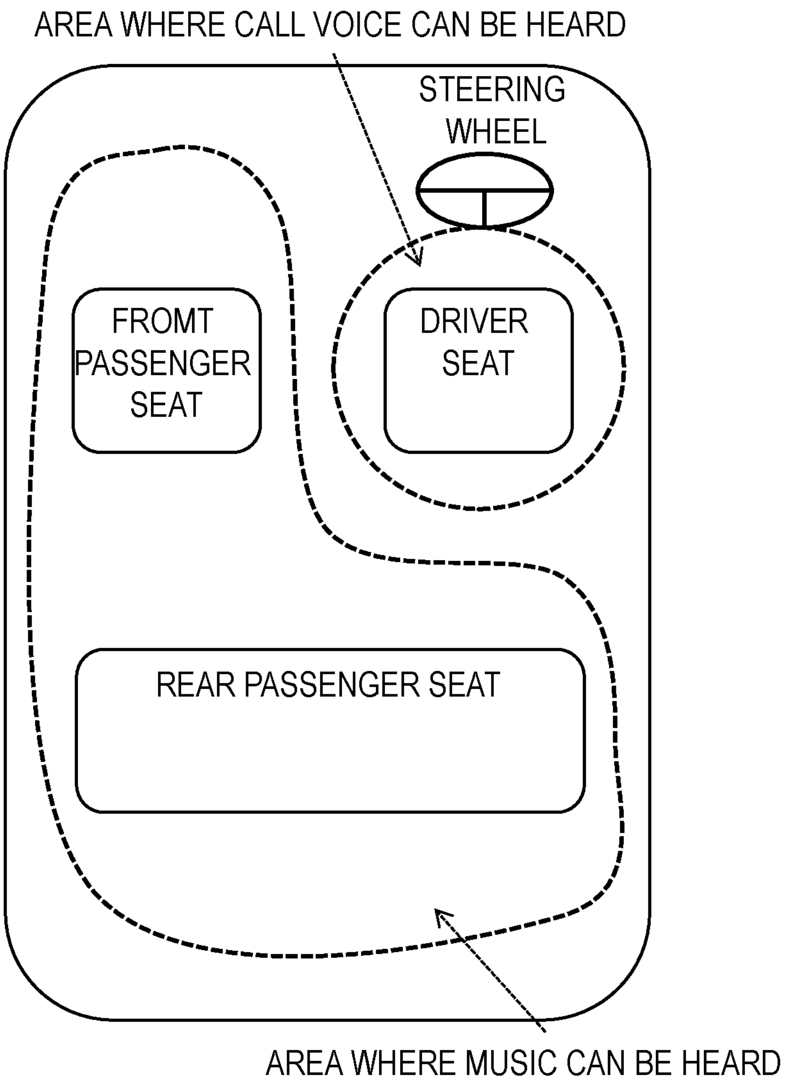
FIG. 5 is a diagram illustrating a state of playback sound in the hands-free call.

Therefore, when the sound based on the sound signal $S_1$, . . . , and the sound signal $S_N$ is referred to as the sound based on the call voice signal, and the sound based on the acoustic signal $A_1$, . . . , and the acoustic signal $A_N$ is referred to as the sound based on the call-time acoustic signal, the first filter coefficient $F_n(\omega)$ (n=1, . . . , N) and the second filter coefficient $\tilde{F}_n(\omega)$ (n=1, . . . , N) are filter coefficients determined such that the sound based on the call voice signal is heard more easily than the sound based on the call-time acoustic signal at the driver seat (namely, position $P_1$) and the sound based on the call voice signal is made difficult to be heard by the sound based on the call-time acoustic signal at the seat other than the driver seat (namely, position $P_m$ (m=2, . . . , M) other than position $P_1$). Therefore, for example, as illustrated in FIG. 5, the sound based on the above-described signals is emitted from each of the speaker $SP_1$, . . . , and the speaker $SP_N$ such that the call voice is mainly heard at the driver seat and the masking sound such as music is mainly heard at the seat other than the driver seat.

As illustrated in FIG. 2, a configuration unit including the first local signal generation unit 120 and the second local signal generation unit 130 is referred to as a local signal generation unit 135. As such, the local signal generation unit 135 performs the following operation (see FIG. 3).

In step S135, the local signal generation unit 135 receives the call voice signal and the call-time acoustic signal output in step S110-1 as inputs, generates the sound signal $S_n$ as the input signal for the speaker $SP_n$ from the call voice signal and generates the acoustic signal $A_n$ as the input signal for the speaker $SP_n$ from the call-time acoustic signal, and outputs the sound signal $S_n$ and the acoustic signal $A_n$, where n=1, . . . , N.

Thereafter, the call environment generation apparatus 100 emits the sound based on the sound signal $S_n$ and the acoustic signal $A_n$ from the speaker $SP_n$, where n=1, . . . , N. This step corresponds to the above-described step S950.

The sound based on the call voice signal is emitted so as to be heard louder at the driver seat (namely, position $P_1$)

than at the seat other than the driver seat (namely, position $P_m$ (m=2, . . . , M) other than position $P_1$), and the sound based on the call-time acoustic signal is emitted so as to be heard louder at the seat other than the driver seat (namely, position $P_m$ (m=2, . . . , M) other than position $P_1$) than at the driver seat (namely, position $P_1$). In other words, the sound based on the call voice signal is emitted so as to be heard more easily than the sound based on the call-time acoustic signal at the driver seat (namely, position $P_1$), and the sound based on the call voice signal is emitted so as to be made difficult to be heard by the sound based on the call-time acoustic signal at the seat other than the driver seat (namely, position $P_m$ (m=2, . . . , M) other than position $P_1$).

The operation by the call environment generation apparatus 100 at end of the call is described with reference to FIG. 4.

In step S110-2, when detecting an end signal of the call, the acoustic signal generation unit 110 generates an acoustic signal obtained by adjusting volume of an acoustic signal to be reproduced after end of the call (hereinafter, referred to as usual-time acoustic signal), by using a volume value before start of the call, and outputs the acoustic signal.

In step S140, the large-area signal generation unit 140 receives the usual-time acoustic signal output in step S110-2 as an input, and filters the usual-time acoustic signal with the third filter coefficient $\hat{F}_n(\omega)$, thereby generating and outputting an acoustic signal $A'_n$ as an input signal for the speaker $SP_n$, where n=1, . . . , N. The third filter coefficient $\hat{F}_n(\omega)$ may be determined as a filter coefficient to filter the usual-time acoustic signal such that sound is uniformly heard at all of the seats.

Finally, the speaker $SP_n$ (n=1, . . . , N) as the speaker 950 receives the acoustic signal $A'_n$ output in step S140 as an input, and emits sound based on the acoustic signal $A'_n$.

According to the embodiment of the present invention, in the case where the call voice is output from the speaker, it is possible to prevent the call contents from being heard by a person other than the person speaking on the phone. In other words, in a case where the driver performs a hands-free call in the automobile, it is possible to cause the call contents not to be known by the passenger.

Second Embodiment

In the first embodiment, generation of the call environment for the driver to perform a hands-free call in the automobile is described. In a second embodiment, for example, generation of a call environment for performing a hands-free call at a seat other than a driver seat in an automobile or in a break room provided with a plurality of seats.

In a case where a hands-free call is performed in an acoustic space where masking sound such as music is played back, for example, in an automobile or a break room, a call environment generation apparatus 200 generates a call environment to prevent call voice from being heard by a person around a person speaking on the phone. To do so, the call environment generation apparatus 200 outputs, from N speakers installed in the acoustic space, the call voice and masking sound (for example, music) to prevent the call voice from being heard by the person around the person speaking on the phone. More specifically, M positions (hereinafter, denoted by $P_1, \ldots, P_M$) to specify a call place are previously set in the acoustic space, and the call environment generation apparatus 200 allows the call voice to be mainly heard at a position $P_{M\_u}$ ($M_u$ is integer satisfying $1 \le M_u \le M$) as the call place, and allows the masking sound such as music to be mainly heard at a position $P_1, \ldots$, a position $P_{M\_u-1}$, a position $P_{M\_u+1}, \ldots$, and a position $P_M$ that are positions other than the position $P_{M\_u}$. In the following, speakers installed in the acoustic space are denoted by $SP_1, \ldots, SP_N$.

Figure 6:
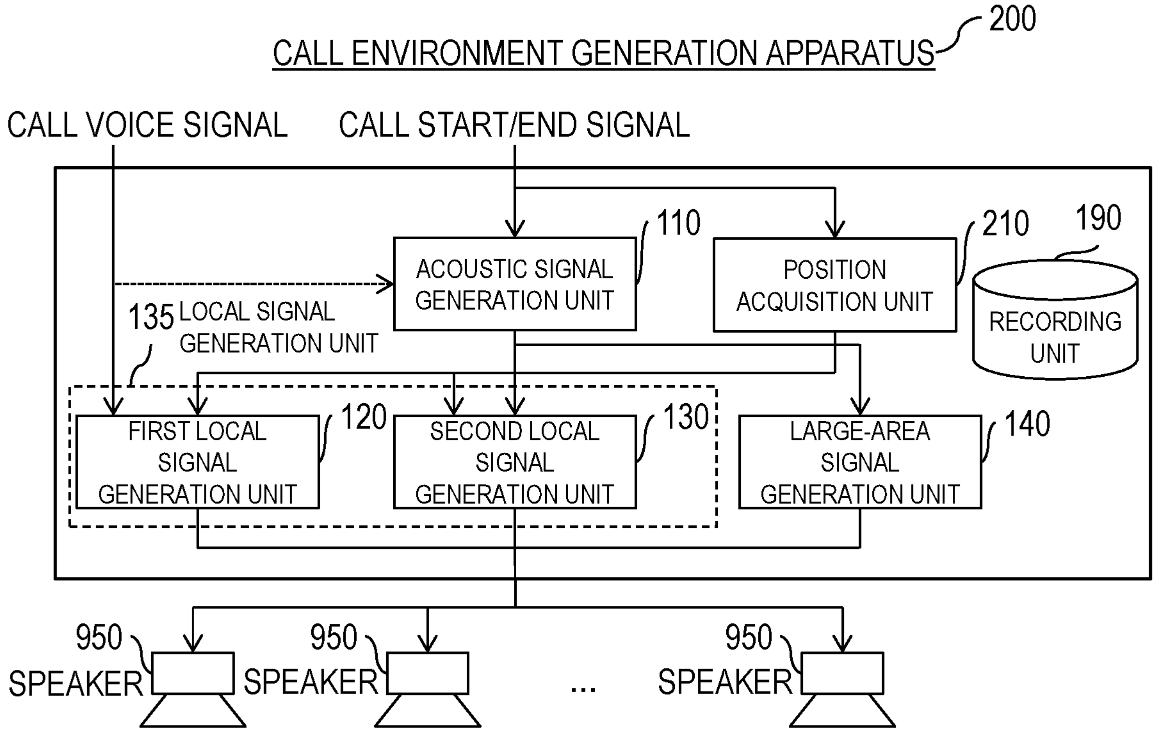
FIG. 6 is a block diagram illustrating an exemplary configuration of a call environment generation apparatus 200.
Figure 7:
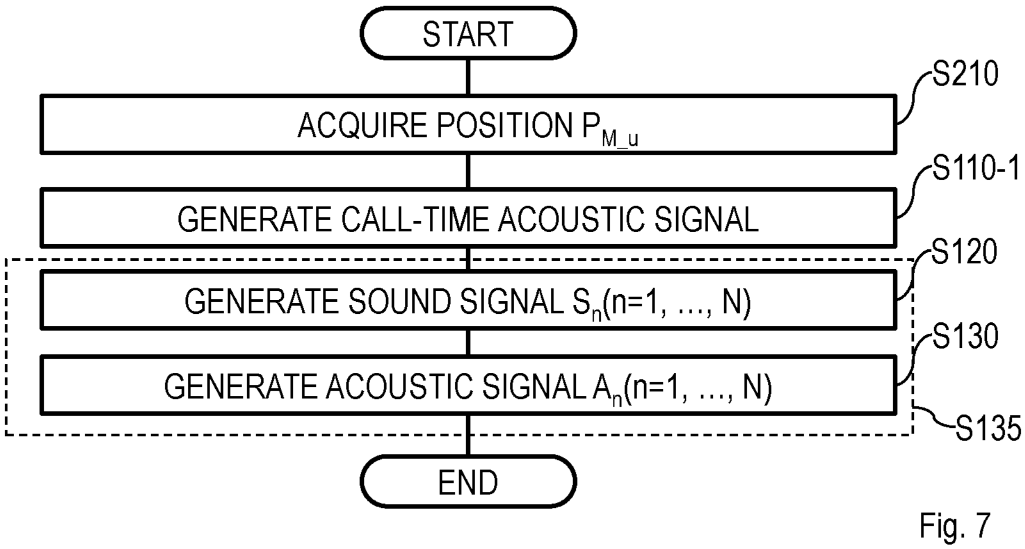
FIG. 7 is a flowchart illustrating exemplary operation by the call environment generation apparatus 200.

The call environment generation apparatus 200 is described below with reference to FIG. 6 and FIG. 7. FIG. 6 is a block diagram illustrating a configuration of the call environment generation apparatus 200. FIG. 7 is a flowchart illustrating operation by the call environment generation apparatus 200. As illustrated in FIG. 6, the call environment generation apparatus 200 includes a position acquisition unit 210, the acoustic signal generation unit 110, the first local signal generation unit 120, the second local signal generation unit 130, the large-area signal generation unit 140, and the recording unit 190.

Further, the call environment generation apparatus 200 is connected to N speakers 950 (namely, speaker $SP_1$, and speaker $SP_N$).

The operation by the call environment generation apparatus 200 at start of a call is described with reference to FIG. 7.

In step S210, when detecting a start signal of a call, the position acquisition unit 210 acquires and outputs the position $P_{M\_u}$ ($M_u$ is integer satisfying $1 \le M_u \le M$) as the call place.

In step S110-1, when detecting the start signal the acoustic signal generation unit 110 generates an acoustic signal obtained by adjusting volume of an acoustic signal to be reproduced during the call (hereinafter, referred to as call-time acoustic signal), by using a predetermined volume value, and outputs the acoustic signal.

In step S120, the first local signal generation unit 120 receives a call voice signal and the position $P_{M\_u}$ output in step S210 as inputs, and filters the call voice signal with the first filter coefficient $F_n(\omega)$, thereby generating and outputting the sound signal $S_n$ as the input signal for the speaker $SP_n$, where n=1, . . . , N. The first filter coefficient $F_n(\omega)$ may be determined as a filter coefficient to filter the call voice signal such that the call voice becomes loud enough to be easily heard at the position $P_{M\_u}$ and the call voice becomes as low as possible at the position $P_m$ (m=1, . . . , $M_u-1$, $M_u+1$, . . . , M) other than the position $P_{M\_u}$. For example, when the transfer characteristics from the speaker $SP_n$ to the position $P_m$ are denoted by $G_{n,m}(\omega)$ (n=1, . . . , N, m=1, . . . , M, where ω is frequency), the first filter coefficient $F_n(\omega)$ (n=1, . . . , N) can be determined as an approximation solution of the following expression.

$$\begin{cases} \sum_{n=1}^{N} F_n(\omega) G_{n,M_u}(\omega) = 1 \\ \sum_{n=1}^{N} F_n(\omega) G_{n,m}(\omega) = 0 (m \neq M_u) \end{cases} \quad \text{[Math. 4]}$$

Note that the above-described approximation solution can be determined by using a least-square method.

In step S130, the second local signal generation unit 130 receives the call-time acoustic signal output in step S110-1 and the position $P_{M\_u}$ output in step S210 as inputs, and filters the call-time acoustic signal with the second filter coefficient $\tilde{F}_n(\omega)$, thereby generating and outputting the acoustic signal $A_n$ as the input signal for the speaker $SP_n$, where n=1, . . . , N. The second filter coefficient $\tilde{F}_n(\omega)$ may be determined as a filter coefficient to filter the call-time acoustic signal such that the masking sound becomes loud enough to make it difficult to hear the call voice at the position $P_m$ (m=1, . . . , $M_u$−1, $M_u$+1, . . . , M) other than the position $P_{M\_u}$ and the masking sound becomes as low as possible at the position $P_{M\_u}$. For example, the second filter coefficient $\tilde{F}_n(\omega)$ (n=1, . . . , N) can be determined as an approximation solution of the following expression.

$$\begin{cases} \sum_{n=1}^{N} \tilde{F}_n(\omega) G_{n,M_u}(\omega) = 0 \\ \sum_{n=1}^{N} \tilde{F}_n(\omega) G_{n,m}(\omega) = 1 (m \neq M_u) \end{cases} \quad \text{[Math. 5]}$$

Note that the above-described approximation solution can be determined by using a least-square method.

Finally, in step S950 (not illustrated), the speaker $SP_n$ (n=1, . . . , N) as the speaker 950 receives the sound signal $S_n$ output in step S120 and the acoustic signal $A_n$ output in step S130 as inputs, and emits sound based on the sound signal $S_n$ and the acoustic signal $A_n$.

As such, when the sound based on the sound signal $S_1$, . . . , and the sound signal $S_N$ is referred to as the sound based on the call voice signal, and the sound based on the acoustic signal $A_1$, . . . , and the acoustic signal $A_N$ is referred to as the sound based on the call-time acoustic signal, the first filter coefficient $F_n(\omega)$ (n=1, . . . , N) and the second filter coefficient $\tilde{F}_n(\omega)$ (n=1, . . . , N) are filter coefficients determined such that the sound based on the call voice signal is heard more easily than the sound based on the call-time acoustic signal at the position $P_{M\_u}$ and the sound based on the call voice signal is made difficult to be heard by the sound based on the call-time acoustic signal at the position $P_m$ (m=1, . . . , $M_u$−1, M) other than the position $P_{M\_u}$. Therefore, the sound based on the above-described signals is emitted from each of the speaker $SP_1$, . . . , and the speaker $SP_N$ such that the call voice is mainly heard at the position $P_{M\_u}$ and the masking sound such as music is mainly heard at the position $P_m$ (m=1, . . . , $M_u$−1, $M_u$+1, . . . , M) other than the position $P_{M\_u}$.

As illustrated in FIG. 6, a configuration unit including the first local signal generation unit 120 and the second local signal generation unit 130 is referred to as the local signal generation unit 135. As such, the local signal generation unit 135 performs the following operation (see FIG. 7).

In step S135, the local signal generation unit 135 receives the call voice signal and the call-time acoustic signal output in step S110-1 as inputs, generates the sound signal $S_n$ as the input signal for the speaker $SP_n$ from the call voice signal and generates the acoustic signal $A_n$ as the input signal for the speaker $SP_n$ from the call-time acoustic signal, and outputs the sound signal $S_n$ and the acoustic signal $A_n$, where n=1, . . . , N.

Thereafter, the call environment generation apparatus 200 emits the sound based on the sound signal $S_n$ and the acoustic signal $A_n$ from the speaker $SP_n$, where n=1, . . . , N. This step corresponds to the above-described step S950.

The sound based on the call voice signal is emitted so as to be heard louder at the position $P_{M\_u}$ than at the position $P_m$ (m=1, . . . , $M_u$−1, $M_u$+1, . . . , M) other than the position $P_{M\_u}$, and the sound based on the call-time acoustic signal is emitted so as to be heard louder at the position $P_m$ (m=1, . . . , $M_u$−1, $M_u$+1, . . . , M) other than the position $P_{M\_u}$ than at the position $P_{M\_u}$. In other words, the sound based on the call voice signal is emitted so as to be heard more easily than the sound based on the call-time acoustic signal at the position $P_{M\_u}$, and the sound based on the call voice signal is emitted so as to be made difficult to be heard by the sound based on the call-time acoustic signal at the position $P_m$ (m=1, . . . , $M_u$−1, $M_u$+1, . . . , M) other than the position $P_{M\_u}$.

Note that the operation by the call environment generation apparatus 200 at end of the call is similar to the operation by the call environment generation apparatus 100 at end of the call (see FIG. 4).

According to the embodiment of the present invention, in the case where the call voice is output from the speaker, it is possible to prevent the call contents from being heard by a person other than the person speaking on the phone. In other words, in the case where the person speaking on the phone performs a hands-free call in the acoustic space, it is possible to cause the call contents not to be known by a person other than the person speaking on the phone.

In the first embodiment and the second embodiment, generation of the call environment for a hands-free call is described; in addition, the present invention is applicable to conversation in a predetermined space such as a vehicle represented by an automobile, and a room. In this case, at least two persons speaking to each other (hereinafter, referred to as speaking persons) are present in the vehicle or the space. Speaking voice from one speaking person is emphasized and emitted so as to be easily heard by the other speaking person(s), and the masking sound is emphasized and emitted such that the speaking voice of the conversation is difficult to be heard by a person other than the speaking persons. Examples of such conversation include so-called In Car Communication.

APPENDIX

Figure 8:
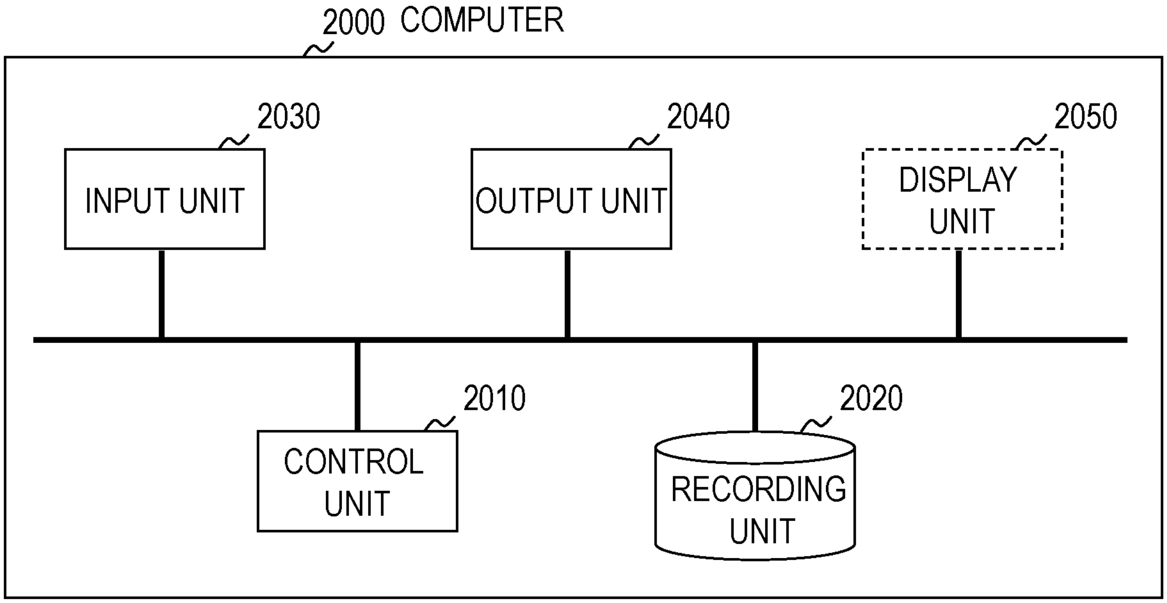
FIG. 8 is a diagram illustrating an exemplary functional configuration of a computer realizing each of the apparatuses according to embodiments of the present invention.

FIG. 8 is a diagram illustrating an exemplary functional configuration of a computer realizing each of the above-described apparatuses. The processing by each of the above-described apparatuses can be realized by causing a recording unit 2020 to read programs to cause the computer to function as each of the above-described apparatuses, and causing a control unit 2010, an input unit 2030, an output unit 2040, and the like to operate.

Each of the apparatuses according to the present invention includes, for example, as a single hardware entity, an input unit to which a keyboard and the like are connectable, an output unit to which a liquid crystal display and the like are connectable, a communication unit to which a communication device (for example, communication cable) communicable with outside of the hardware entity is connectable, a CPU (Central Processing Unit that may include cash memory, register, and the like), a RAM and a ROM as memories, an external storage device as a hard disk, and a bus that connects the input unit, the output unit, the communication unit, the CPU, the RAM, the ROM, and the external storage device so as to enable data exchange. Further, as necessary, the hardware entity may include a device (drive) that can perform reading and writing of a recording medium such as a CD-ROM. Examples of a physical entity including such hardware resources include a general-purpose computer.

The external storage device of the hardware entity stores programs necessary to realize the above-described functions, data necessary for processing of the programs, and the like (for example, programs may be stored in a ROM as read-only storage device without being limited to external storage devices). Further, data obtained by processing of these programs, and the like are appropriately stored in the RAM, the external storage device, or the like.

In the hardware entity, the programs stored in the external storage device (or ROM or the like) and the data necessary for processing of the programs are read to the memory as necessary, and are appropriately interpreted, executed, and processed by the CPU. As a result, the CPU realizes predetermined functions (above-described configuration units represented as units).

The present invention is not limited to the above-described embodiments, and can be appropriately modified without departing from the gist of the present invention. Further, the processing described in the above-described embodiments may be executed not only in a time-sequential manner in order of description but also in parallel or individually based on processing capability of the device executing the processing or as necessary.

As described above, in the case where the processing functions of the hardware entity (apparatuses according to present invention) described in the above-described embodiments are realized by the computer, the processing contents of the functions that must be held by the hardware entity are described by programs. Further, when the computer executes the programs, the processing functions by the above-described hardware entity are realized on the computer.

The programs describing the processing contents can be recorded in a computer-readable recording medium. The computer-readable recording medium can be any recording medium such as a magnetic recording device, an optical disc, a magneto-optical recording medium, and a semiconductor memory. More specifically, for example, a hard disk device, a flexible disk, a magnetic tape, and the like are usable as the magnetic recording device. For example, a DVD (Digital Versatile Disc), a DVD-RAM (Random Access Memory), a CD-ROM (Compact Disc Read Only Memory), a CD-R (Recordable)/RW (ReWritable), and the like are usable as the optical disc. For example, an MO (Magneto-Optical disc) and the like are usable as the magneto-optical recording medium. For example, an EEP-ROM (Electronically Erasable and Programmable-Read Only Memory) and the like are usable as the semiconductor memory.

Further, distribution of the programs is performed by, for example, selling, transferring, or lending a portable recording medium storing the programs, such as a DVD or a CD-ROM. Furthermore, the programs may be distributed by being stored in a storage device of a server computer and being transferred from the server computer to other computers through a network.

For example, the computer executing such programs first temporarily stores the programs recorded in the portable recording medium or the programs transferred from the server computer, in an own storage device. At the time of executing processing, the computer reads the programs stored in the own storage device and executes the processing based on the read programs. Alternatively, as another execution form for the programs, the computer may read the programs directly from the portable recording medium and execute the processing based on the programs. Further, the computer may successively execute the processing based on the received programs every time the programs are transferred from the server computer to the computer. Further alternatively, in place of the transfer of the programs from the server computer to the computer, the above-described processing may be executed by a so-called ASP (Application Service Provider) service that realizes the processing functions only by an execution instruction and result acquisition from the server computer. Note that the programs in this form include information that is used in processing by an electronic computer and acts like programs (such as data that is not direct command to computer but has properties defining computer processing).

Although the hardware entity is configured through execution of the predetermined programs on the computer in this form, at least a part of these processing contents may be realized in a manner of hardware.

The above-described description of the embodiments of the present invention is presented for the purpose of illustration and description. The description is not intended to be exhaustive or not intended to limit the invention to the precise form disclosed. Modifications and variations are possible based on the above-described teachings. The embodiments are selected and described to provide the best illustration of the principle of the present invention, and to enable a person skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

The invention claimed is:

1. A call environment generation method comprising, when speakers installed in an acoustic space are denoted by $SP_1, \ldots, SP_N$, and positions to specify a call place in the acoustic space are denoted by $P_1, \ldots, P_M$:

a position acquisition step of acquiring, when a call environment generation apparatus detects a start signal of a call, a position $P_{M\_u}$ ($M_u$ is integer satisfying $1 \le M_u \le M$) as a call place of the call; and a sound emission step of causing the call environment generation apparatus to emit, from a speaker $SP_n$, sound based on a sound signal $S_n$ as an input signal for the speaker $SP_n$ and an acoustic signal $A_n$ as an input signal for the speaker $SP_n$, where $n=1, \ldots, N$, the sound signal $S_n$ being generated from a voice signal of the call, the acoustic signal $A_n$ being generated from an acoustic signal that is obtained by adjusting volume of an acoustic signal to be reproduced during the call (hereinafter, referred to as call-time acoustic signal), wherein sound based on a sound signal $S_1, \ldots,$ and a sound signal $S_N$ is referred to as sound based on the voice signal of the call, and sound based on an acoustic signal $A_1, \ldots,$ and an acoustic signal $A_N$ is referred to as sound based on the call-time acoustic signal, the sound based on the voice signal of the call is emitted to be heard louder at the position $P_{M\_u}$ than at a position $P_m$ ($m=1, \ldots, M_u-1, M_u+1, \ldots, M$) other than the position $P_{M\_u}$, and the sound based on the call-time acoustic signal is emitted to be heard louder at the position $P_m$ ($m=1, \ldots, M_u-1, M_u+1, \ldots, M$) other than the position $P_{M\_u}$ than at the position $P_{M\_u}$.

2. The call environment generation method according to claim 1, wherein, in a case where sound based on an acoustic signal is not emitted in the acoustic space before the start signal of the call is detected, the acoustic signal to be reproduced during the call is an acoustic signal corresponding to previously prepared sound for masking call voice.

3. A call environment generation method comprising, when speakers installed in an automobile are denoted by $SP_1, \ldots, SP_N$, a position of a driver seat in the automobile is denoted by $P_1$, positions of seats other than the driver seat in the automobile are denoted by $P_2, \ldots, P_M$, a filter coefficient used to generate an input signal for a speaker $SP_n$ (hereinafter, referred to as first filter coefficient) is denoted by $F_n(\omega)$ (n=1, . . . , N, where ω is frequency), and a filter coefficient that is different from the first filter coefficient and is used to generate an input signal for the speaker $SP_n$ (hereinafter, referred to as second filter coefficient) is denoted by $\tilde{F}_n(\omega)$ (n=1, . . . , N, where ω is frequency):

an acoustic signal generation step of generating, when a call environment generation apparatus detects a start signal of a call, an acoustic signal that is obtained by adjusting volume of an acoustic signal to be reproduced during the call (hereinafter, referred to as call-time acoustic signal), by using a predetermined volume value;

a first local signal generation step of causing the call environment generation apparatus to generate a sound signal $S_n$ as an input signal for the speaker $SP_n$ by filtering a voice signal of the call with the first filter coefficient $F_n(\omega)$, where n=1, . . . , N; and a second local signal generation step of causing the call environment generation apparatus to generate an acoustic signal $A_n$ as an input signal for the speaker $SP_n$ by filtering the call-time acoustic signal with the second filter coefficient $\tilde{F}_n(\omega)$, where n=1, . . . , N.

4. The call environment generation method according to claim 3, wherein sound based on a sound signal $S_1$, . . . , and a sound signal $S_N$ is referred to as sound based on the voice signal of the call, and sound based on an acoustic signal $A_1$, . . . , and an acoustic signal $A_N$ is referred to as sound based on the call-time acoustic signal, and the first filter coefficient $F_n(\omega)$ (n=1, . . . , N) and the second filter coefficient $\tilde{F}_n(\omega)$ (n=1, . . . , N) are filter coefficients determined to allow the sound based on the voice signal of the call to be heard more easily than the sound based on the call-time acoustic signal at the position $P_1$, and to make the sound based on the voice signal of the call difficult to be heard by the sound based on the call-time acoustic signal at a position $P_m$ (m=2, . . . , M) other than the position $P_1$.

5. The call environment generation method according to claim 3, wherein transfer characteristics from the speaker $SP_n$ to a position $P_m$ are denoted by $G_{n,m}(\omega)$ (n=1, . . . , N, m=1, . . . , M, where ω is frequency), the first filter coefficient $F_n(\omega)$ (n=1, . . . , N) is a filter coefficient determined as an approximation solution of the following expression:

$$\begin{cases} \sum_{n=1}^{N} F_n(\omega)G_{n,1}(\omega) = 1 \\ \sum_{n=1}^{N} F_n(\omega)G_{n,m}(\omega) = 0 (m \neq 1) \end{cases}, \quad \text{[Math. 6]}$$

and the second filter coefficient $\tilde{F}_n(\omega)$ (n=1, . . . , N) is a filter coefficient determined as an approximation solution of the following expression:

$$\begin{cases} \sum_{n=1}^{N} \tilde{F}_n(\omega)G_{n,1}(\omega) = 0 \\ \sum_{n=1}^{N} \tilde{F}_n(\omega)G_{n,m}(\omega) = 1 (m \neq 1) \end{cases}. \quad \text{[Math. 7]}$$

6. The call environment generation method according to claim 3, wherein the predetermined volume value is a preset volume value, or a volume value calculated based on estimated volume of the acoustic signal to be reproduced during the call and estimated volume of the voice signal of the call.

7. A call environment generation method comprising, when speakers installed in an acoustic space are denoted by $SP_1$, . . . , $SP_N$, positions to specify a call place in the acoustic space are denoted by $P_1$, . . . , $P_M$, a filter coefficient to generate an input signal for a speaker $SP_n$ (hereinafter, referred to as first filter coefficient) is denoted by $F_n(\omega)$ (n=1, . . . , N, where ω is frequency), and a filter coefficient that is different from the first filter coefficient and is used to generate an input signal for the speaker $SP_n$ (hereinafter, referred to as second filter coefficient) is denoted by $\tilde{F}_n(\omega)$ (n=1, . . . , N, where ω is frequency):

a position acquisition step of acquiring, when a call environment generation apparatus detects a start signal of a call, a position $P_{M\_u}$ ($M_u$ is integer satisfying $1 \leq M_u \leq M$) as a call place of the call;

an acoustic signal generation step of generating, when the call environment generation apparatus detects the start signal, an acoustic signal that is obtained by adjusting volume of an acoustic signal to be reproduced during the call (hereinafter, referred to as call-time acoustic signal), by using a predetermined volume value;

a first local signal generation step of causing the call environment generation apparatus to generate a sound signal $S_n$ as an input signal for the speaker $SP_n$ by filtering a voice signal of the call with the first filter coefficient $F_n(\omega)$, where n=1, . . . , N; and a second local signal generation step of causing the call environment generation apparatus to generate an acoustic signal $A_n$ as an input signal for the speaker $SP_n$ by filtering the call-time acoustic signal with the second filter coefficient $\tilde{F}_n(\omega)$, where n=1, . . . , N.

8. The call environment generation method according to claim 7, wherein sound based on a sound signal $S_1$, . . . , and a sound signal $S_N$ is referred to as sound based on the voice signal of the call, and sound based on an acoustic signal $A_1$, . . . , and an acoustic signal $A_N$ is referred to as sound based on the call-time acoustic signal, and the first filter coefficient $F_n(\omega)$ (n=1, . . . , N) and the second filter coefficient $\tilde{F}_n(\omega)$ (n=1, . . . , N) are filter coefficients determined to allow the sound based on the voice signal of the call to be heard more easily than the sound based on the call-time acoustic signal at the position $P_{M\_u}$, and to make the sound based on the call voice signal difficult to be heard by the sound based on the call-time acoustic signal at the position $P_m$ (m=1, . . . , $M_u-1$, $M_u+1$, . . . , M) other than the position $P_{M\_u}$.

9. The call environment generation method according to claim 7, wherein the predetermined volume value is a preset volume value, or a volume value calculated based on estimated volume of the acoustic signal to be reproduced during the call and estimated volume of the voice signal of the call.

10. A call environment generation apparatus comprising, when speakers installed in an automobile are denoted by $SP_1$, . . . , $SP_N$, a position of a driver seat in the automobile is denoted by $P_1$, positions of seats other than the driver seat in the automobile are denoted by $P_2$, . . . , $P_M$, a filter coefficient used to generate an input signal for a speaker $SP_n$ (hereinafter, referred to as first filter coefficient) is denoted by $F_n(\omega)$ (n=1, . . . , N, where ω is frequency), and a filter coefficient that is different from the first filter coefficient and is used to generate an input signal for the speaker $SP_n$ (hereinafter, referred to as second filter coefficient) is denoted by $\tilde{F}_n(\omega)$ (n=1, . . . , N, where ω is frequency):

processing circuitry configured to: execute an acoustic signal generation processing configured to generate, when detecting a start signal of a call, an acoustic signal that is obtained by adjusting volume of an acoustic signal to be reproduced during the call (hereinafter, referred to as call-time acoustic signal), by using a predetermined volume value;

a first local signal generation processing configured to generate a sound signal $S_n$ as an input signal for the speaker $SP_n$ by filtering a voice signal of the call with the first filter coefficient $F_n(\omega)$, where n=1, . . . , N; and a second local signal generation processing configured to generate an acoustic signal $A_n$ as an input signal for the speaker $SP_n$ by filtering the call-time acoustic signal with the second filter coefficient $\tilde{F}_n(\omega)$, where n=1, . . . , N.

11. A non-transitory computer-readable recording medium storing a program to cause a computer to execute the call environment generation method according to claim 1.

12. A non-transitory computer-readable recording medium storing a program to cause a computer to execute the call environment generation method according to claim 3.

13. A non-transitory computer-readable recording medium storing a program to cause a computer to execute the call environment generation method according to claim 7.

* * * * *